Figure 1:
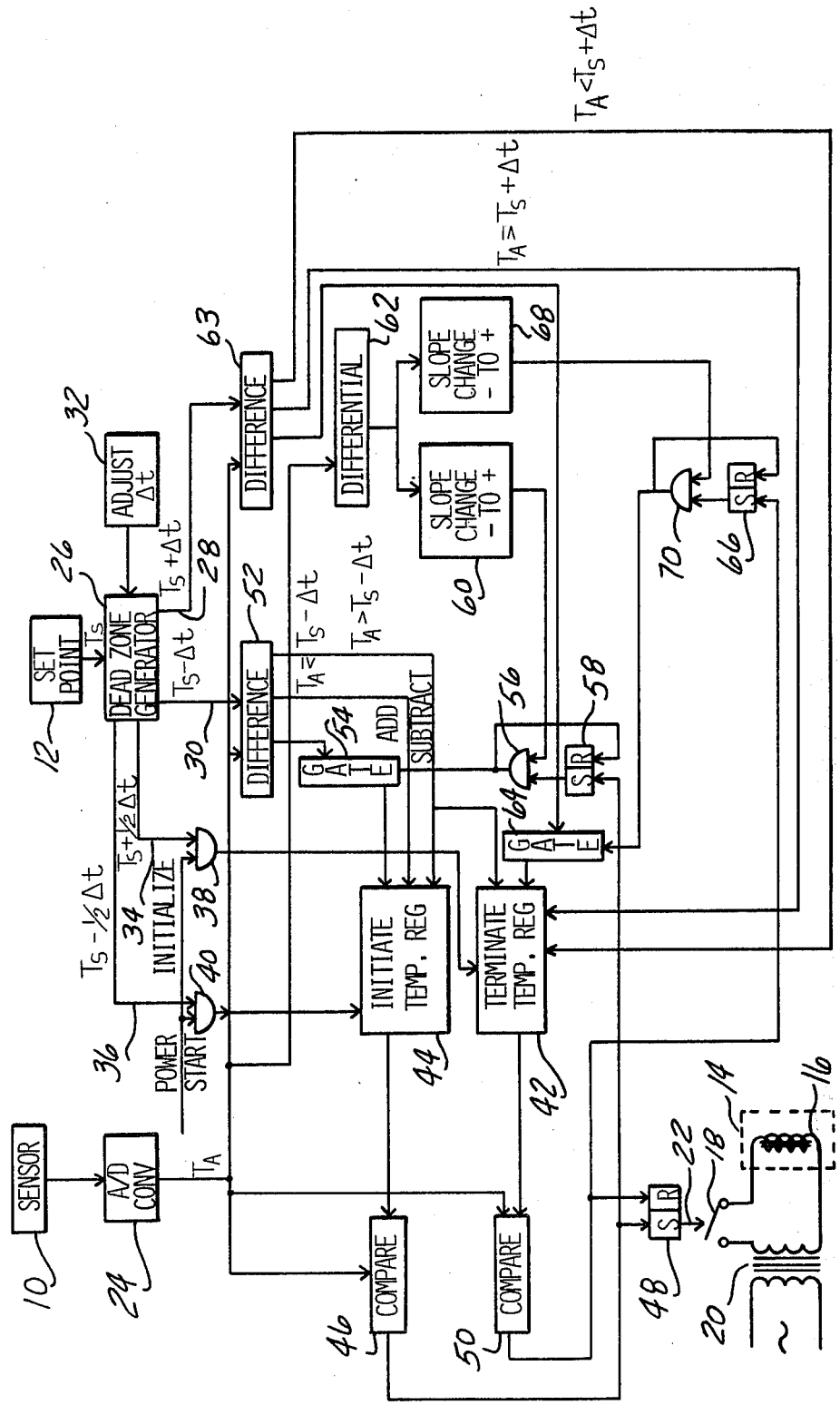

United States Patent [19]

Levine

[11] 4,410,132
[45] Oct. 18, 1983

[54] THERMOSTAT WITH DEAD ZONE SEEKING SERVO ACTION

[76] Inventor: Michael R. Levine, 2900 Heatherway, Ann Arbor, Mich. 48104

[21] Appl. No.: 414,185

[22] Filed: Sep. 2, 1982

Related U.S. Application Data

[63] Continuation-in-part of Ser. No. 206,761, Nov. 14, 1980, Pat. No. 4,356,962.

[51] Int. Cl.³ .............................. F24D 5/10; F23N 5/20
[52] U.S. Cl. ..................................... 236/11; 236/46 R; 364/148
[58] Field of Search ................ 236/46 R, 78 R, 78 D, 236/1, 11; 165/12; 62/231, 234; 364/148, 153

[56] References Cited

U.S. PATENT DOCUMENTS

| | | | |
|---|---|---|---|
| 4,199,690 | 4/1980 | Meyer | 165/26 X |
| 4,265,298 | 5/1981 | Sumner, Jr. et al. | 165/12 X |
| 4,344,565 | 8/1982 | Kojima et al. | 236/46 R |

Primary Examiner—William E. Wayner
Attorney, Agent, or Firm—Krass, Young & Schivley

[57] ABSTRACT

An electric thermostat operative to be connected to a furnace or other temperature modifying apparatus to control its state of operation includes means for generating a desired temperature set-point signal and means for measuring ambient temperature at the thermostat. When the ambient temperature falls sufficiently below this set-point, the furnace is energized until the ambient temperature rises to a stored temperature level, also below the set-point. The system then monitors the peak ambient temperature reached during the following temperature overshoot resulting from the inertia of the furnace. The temperature differential between this limiting temperature obtained and the set-point is then added to the stored temperature value if the system did not obtain the set point temperature or substracted from the stored temperature value if the system exceeded the set-point value. The system also stores a second predetermined temperature value below the set point to establish a "dead zone" and similar control is exercised over the temperature at which the energizing signal for the furnace is initiated so that the system adaptively maintains a temperature range exactly limited by the dead zone independent of environmental temperature changes.

7 Claims, 2 Drawing Figures

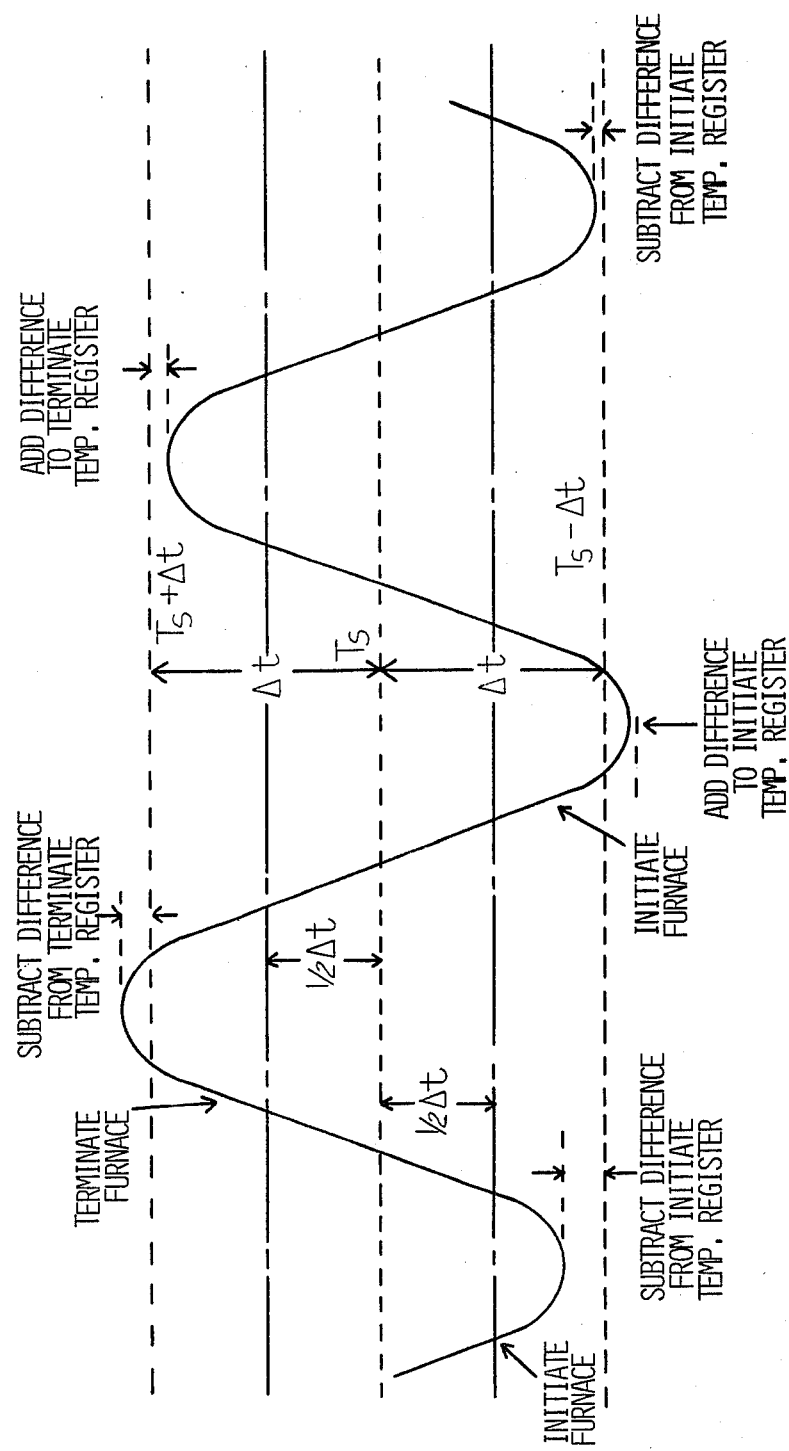

THERMOSTAT WITH DEAD ZONE SEEKING SERVO ACTION

CROSS REFERENCE TO RELATED APPLICATIONS

This application is a continuation-in-part application of U.S. Ser. No. 206,761, filed Nov. 14, 1980, now U.S. Pat. No. 4,356,962.

TECHNICAL FIELD

This invention relates to an electronic thermostat for measuring the temperature within a structure and controlling energization of temperature modifying apparatus for the structure such as a furnace or air conditioning system, and more particularly to such a thermostat which adaptively modifies the operation of the temperature modifying apparatus during each cycle in order to attain predetermined criteria.

BACKGROUND ART

Thermostats for heating furnaces and/or air cooling systems (hereinafter collectively referred to as "furnaces") of the type employed in residences and many commercial and industrial buildings generally include storage means for a desired temperature set-point, means for measuring the actual temperature within the building and means for switching the furnace on or off as a function of differences between the set-point temperature and the actual temperature.

To prevent the furnace from being rapidly turned on and then off as it hunts about the set-point temperature, these thermostats have a built-in dead zone; i.e., the temperature at which the thermostat contacts are closed to energize the furnace is slightly below the temperature at which they open after the furnace has warmed the room containing the thermostat. For example, when the set-point of the thermostat is adjusted to 70° F., the furnace burner may be energized when the temperature drops to 69° and de-energized when the room is heated to 71°. The temperature differential of the dead zone is determined on the basis of several considerations: if the dead zone is made very small the furnace will turn on and off relatively rapidly when the room temperature is close to the set-point, causing increased wear on the valves and the like, a decreased thermal efficiency because of the energy required to repeatedly heat the furnace and cooling ducts, and an annoying noise level produced by the rapid changes in air movement. A larger dead zone produces a higher thermal efficiency and less system wear and noise but the occupants will notice temperature changes in excess of about 3°, imposing a practical limit on the maximum width of the dead zone.

In practice, the dead zone is typically set to something slightly less than 3° because after the thermostat contacts are opened, turning off the burner, the furnace continues to raise the temperature of the house for a short period of time while the blower forces previously heated air into the room. This produces a "thermal overshoot" in which the temperature of the house reaches a maximum some period of time after the furnace burner is de-energized and the maximum temperature excursion into the thermostat room is somewhat higher than the temperature differential represented by the dead zone in the thermostat. The extent to which this thermal overshoot occurs varies as a function of thermal loss of the heated building to the exterior; in the winter it may be very slight and in the spring when a relatively small temperature differential exists between the heated building and the exterior, it will be substantially larger because the heated air left in the furnace and ducts when the burner is extinguished will produce a larger temperature rise in the house. The thermal overshoot will also vary as the function of the building construction. A building with masonary walls must be heated for a longer period of time than a wood frame building to produce a specific temperature change. The dead zone setting is necessarily a compromise which produces an overly large temperature excursion in warm weather and an unnecessarily short excursion in cold weather.

A similar compromise must be made in setting the lower temperature limit of the dead zone. The room temperature continues to drop for some period of time after the conventional thermostat recognizes the low temperature setting of the dead zone and de-energizes the furnace burner. This lag results from the time required for the furnace bonnet to heat up to a sufficient temperature to allow the blower to be started. In cold, windy weather this "undershoot" will be larger than in warm still weather when there is a low rate of heat loss from the house.

These compromises affect the thermal efficiency of the heating system. If the burner's cycle time for a specific building could be optimally adjusted for each set of atmospheric conditions the thermal efficiency of the furnace system would be improved.

DISCLOSURE OF THE INVENTION

The present invention eliminates the need to set the temperature dead zone at compromise levels by providing a thermostat including adaptive means which senses the change in building temperature which occurs as a result of manipulations of the temperatures at which energization and/or de-energization of the furnace occurs and adaptively modifies the temperature at which the energizing and de-energizing signals for the furnace occur to optimize the energy efficiency of the furnace at the immediate ambient conditions.

A preferred embodiment of the invention, which will subsequently be described in detail, adaptively controls the time of the de-energization of the furnace as a function of the ambient temperature on the thermostat. The system includes a register for storing a de-energization temperature which is below the set-point temperature representing the upper value of the dead zone. The energization control signal for the furnace is terminated when the ambient temperature reaches the stored value. The stored value is incremented or decremented following each energization cycle by a temperature value equal to the difference between the set-point temperature and the limiting value of the temperature obtained as a result of the energizing control signal. By way of example, if the thermostat is controlling a furnace heating a building, following termination of the energizing signal to the furnace the ambient temperature within the building will continue to increase as a result of the thermal inertia of the heating system. The thermostat signal representative of the ambient temperature is sensed to detect the point at which the temperature stops increasing and begins to decrease. That "limiting" temperature is compared with the set-point to determine whether the system overshoot the set-point, in which case the stored temperature value is decreased by the temperature value equal to the difference between the set-point and the limiting temperature, i.e., the "overshoot" or the temperature value is incremented by the difference if the system undershot the set-point. In this manner, the turn-off temperature is adaptively modified from one heating cycle to the next in order to seek a turn-off temperature at which the inertia of the heating system causes the limiting temperature to equal the set-point.

The thermostat also adaptively controls the temperature at which the furnace energizing signal is initiated by monitoring the drop in temperature that occurs following the initiation of the energizing signal and before the furnace has begun to heat the building, to adaptively maintain the minimum limiting temperature at the lower temperature of the dead zone. The minimum set-point is again compared with the limiting temperature to derive an error temperature value that is either added or subtracted to the energizing signal turn-on temperature.

It should be understood that the control system of the present invention could operate on a valve in a hot water system or a damper in a zone control system as well as on the furnace directly and when the terms "furnace" or "heat modifying apparatus" are used hereinafter they should be understood to encompass such flow control devices as well as prime heating or cooling devices themselves.

While the control functions performed by the present invention are highly sophisticated, they require little or no hardware beyond that associated with a conventional electronic thermostat of the type described in my U.S. Pat. Nos. 4,172,555 or 4,206,872. When the system employs a micro-processor the necessary modification to achieve these control functions, and their attendant improvement in thermal efficiency, may be implemented completely in software.

Other objectives, advantages and applications of the present invention will be made apparent by the following detailed description of the preferred embodiment of the invention. The description makes reference to the accompanying drawings in which:

FIG. 1 is a schematic drawing of a preferred embodiment of my invention which adaptively modifies the temperature at which the furnace burner is energized and de-energized in order to provide an oscillation of the ambient temperature between limits defined by the dead zone; and FIG. 2 is a graph of ambient temperature versus time over several operational cycles illustrating the operation of the present invention.

The embodiment of the invention illustrated in schematic form in FIG. 1 operates to receive the output of an ambient temperature sensor 10 and a digital signal representative of the desired temperature set-point from an input circuit 12, and operates to generate control circuit signals for a temperature modifying apparatus, schematically illustrated as a furnace 14, for the volume containing the temperature sensor 10. The furnace 14 is controlled between an energized and de-energized state by an electrical solenoid 16 and the energization of the solenoid is controlled by a single-pole switch 18 connected in series with the secondary of the power transformer 20 and the solenoid 16. A signal from the thermostat on line 22 controls the state of the switch 18 to energize or de-energize the furnace 14.

The thermostat is illustrated schematically and could be implemented either with discrete sub-systems represented by the blocks in FIG. 1 or by a suitably programmed general purpose computer, preferably a microcomputer. The blocks of FIG. 1 may be viewed as functional tasks to be performed by a computer.

The output of the temperature sensor 10 will typically be in analog form and is provided in an analog to digital convertor 24 which generates a digital output signal $T_A$ representative of the ambient temperature at the thermostat.

The set-point input unit 12 may be manually adjustable or the set point may be alternatively derived from a stored program of desired temperatures over a repetitive time cycle in the manner disclosed in my U.S. Pat. No. 4,172,555. In either event, the set-point signal $T_S$, is provided to a dead-zone generator 26 which adds and subtracts the same small incremental value $\Delta_T$ from the set-point temperature to derive two output signals $T_{S+\Delta T}$, which occurs on line 28, and $T_{S-\Delta T}$ which occurs on line 30. By way of example, the set-point temperature may be 70° F. and $\Delta_T$ may be 1° F., in which case the output on line 28 would be 71°, effectively establishing the top value of the dead-zone, and the digital signal on line 30 would be representative of 69° F., the bottom value of the dead-zone. The dead-zone value $\Delta_T$ may be adjusted with a manual input 32.

The dead-zone generator 26 also provides a pair of signals equal to the set-point temperature plus and minus one-half of the dead zone value $\Delta_T$ on lines 34 and 36, respectively. These signals are provided to AND gates 38 and 40, respectively, which are each conditioned by a POWER START SIGNAL which occurs when power is first applied to the thermostat or renewed after an interruption. The output of the gate 38 is provided to a terminate temperature register 42 and initializes the temperature stored in that register. Similarly, the output of gate 40 is provided to an initiate temperature register 44 and initializes that value.

The output of the initiate temperature register 44 and the ambient temperature $T_A$, as generated by the analog-to-digital converter 24, are both provided to a comparator circuit 46 which generates an output when the ambient temperature is less than the value in the initiate temperature register 44. The output of the comparator circuit 46 is provided to the set input of a flip-flop 48. The signal on line 22 which controls furnace switch 18 is provided by the set output of the flip-flop 48.

Similarly, the output of the terminate temperature register 42 is provided to a comparator 50, as is the ambient temperature from the analog to digital converter 24. The comparator 50 provides an output signal when the ambient temperature equals or exceeds the ambient temperature.

The output of the comparator 50 is provided to the reset input of flip-flop 48 and causes termination of the energizing signal on line 22 to the furnace.

The circuit thus far described would cause the furnace to be energized when the ambient temperature dropped to the value stored in the initiate temperature register 44 and would de-energize the furnace when its operation raised the ambient temperature to the value stored in the terminate temperature register 42. Because of the thermal inertia of the furnace, the room temperature continues to drop for some period of time after the furnace is energized, and continues to rise for some time period after the furnace is de-energized. Accordingly, the ambient temperature will oscillate between values somewhat lower than the temperature stored in the initiate temperature register 44 and somewhat greater than temperature stored in the terminate temperature register 42. The balance of the thermostat circuit is directed toward adaptively modifying the values stored in the temperature registers 42 and 44 in order to cause the temperature excursions to meet the precise limits of the dead zone as represented by the digital values in lines 28 and 30. The adaptive process is necessary because of the variation in the rate of heat exchange between the control building and its surrounding as a result of weather changes.

The value in the initiate temperature register 44 is modified by a value equal to the extent that the ambient temperature at its limiting lower value following each initiation of the furnace departs from the temperature established as the bottom value of the dead zone. In order to achieve this, the signal on line 30, representative of the bottom value of the dead zone, as well as the ambient temperature signal from converter 24, are provided to a different generator or algebraic subtracting unit 52. This unit continually provides a digital signal representative of the difference between the ambient temperature and the bottom of the dead zone to a gate 54. The difference circuit 52 also provides two lines to the initiate temperature register, one indicating that the ambient temperature is equal to or less than the bottom value of the dead zone, and the other indicating that the ambient temperature is greater than the bottom value of the dead zone. These signals condition whether the difference signal provided by the gate 54 is added or subtracted from the value stored in the initiate temperature register 44.

This modification process occurs once each temperature cycle as controlled by the output of an AND gate 56 that conditions the gate 54 to allow the difference signal from unit 52 to be applied to the register 44.

The AND gate 56 is conditioned by the set output of the flip-flop 58. Flip-flop 58 is set by the same output from the comparator 46 which sets the flip-flop 48 and thus initiates the energizing signal for the furnace 14. Thus, the flip-flop 58 is set each time the furnace is energized. It is reset by the output of the gate 56. The output of the gate 56 occurs when its second conditioning input is present. That input is derived from a unit 60 that detects a change in slope of the rate of change of temperature from negative to positive; that is, when the temperature stops falling and begins to rise. The slope change unit 60 analyzes the direction of the rate of change of the ambient temperature based upon a differential signal provided by unit 62 that has the ambient temperature as its input.

Thus, each time the ambient temperature reaches the lower value stored in the initiate temperature register 44 the flip-flop 58 is set and when the ambient temperature stops dropping and begins to rise, the gate 56 provides an output to gate 54 that causes an adjustment of the number stored in the initiate temperature register 44 by a value equal to the difference between the ambient temperature and the bottom value of the dead zone, as generated by the circuit 52. This value is added to the value in the initiate temperature register if the ambient temperature exceeded the bottom value of the dead zone and is substracted from the value of the initiate temperature register if the ambient temperature did not reach the bottom of the dead zone. At the same time, the flip-flop 58 is reset to await the next cycle.

The temperature value in the terminate temperature register 42 is similarly modified. A difference circuit 63 receives the ambient temperature and the temperature at the top of the dead zone and provides their difference to a gate 64. The difference circuit 63 also provides a pair of outputs to the terminate temperature register 42 indicating whether the ambient temperature exceeds or is less than the top of the dead zone. Each time the ambient temperature reaches the value stored in the terminate temperature register 42, the flip-flop 48 is reset to terminate the energizing signal for the furnace 14 and a flip-flop 66 is set. When the ambient temperature stops increasing and begins to decrease, at the peak of its oscillation, a circuit 68 which analyzes the output of circuit 62 provides a conditioning input to an AND gate 70. The AND gate 70 conditions the gate 64 to allow the terminate temperature register 42 to be modified and simultaneously resets the flip-flop 66.

In operation, when the power is turned on, the temperature registers 42 and 44 are initialized with values generated by the dead zone generator. The furnace is then energized and de-energized as a function of these values and the values are adaptively modified once each cycle as a function of temperature differences between limiting values of ambient temperature and the values of the dead zone.

I claim:

1. In a thermostat operative to be connected to a temperature modifying apparatus to control the operative state of the apparatus and including means for generating an electrical signal representative of a desired temperature set-point and means for generating an electrical signal representative of the ambient temperature at the thermostat, the improvement comprising: means for generating control signals for the temperature modifying apparatus operative to control it into a state which causes the ambient temperature to move toward the set point; and means for adaptively modifying the time of termination of each of said control signals as a function of the temperature difference between said set-point and the limit of the ambient temperature attained the previous time the temperature modifying apparatus was controlled to said state.

2. The thermostat of claim 1 wherein said means for adaptively modifying the time of termination of each of said control signals as a function of the temperature difference between the set-point and the limiting temperature attained since the previous time the temperature modifying apparatus was controlled to said state operates to terminate each of said control signals when the electrical signal representative of the ambient temperature at the thermostat attains a value representative of a temperature constituting the algebraic sum of the temperature at which the control signal was terminated the previous time the temperature modifying apparatus was controlled to said state and the differential between the set-point temperature and the limit of the ambient temperature reached the previous time the temperature modifying apparatus was controlled to said state.

3. The thermostat of claim 2 in which the temperature modifying apparatus includes a device operative to be disposed in either an energized or de-energized state and said control signals have one of two possible values, one of the values corresponding to the energized state and the other corresponding to the de-energized state of the device.

4. The thermostat of claim 3 in which the temperature modifying apparatus is a furnace having a burner and the control signals energize or de-energize the furnace burner.

5. The thermostat of claim 3 in which the temperature modifying apparatus is a furnace having a blower and the control signals energize or de-energize the furnace blower.

6. In a thermostat operative to be connected to a temperature modifying apparatus to control the operative state of the apparatus and including means for generating an electrical signal representative of a desired temperature set-point and means for generating an electrical signal representative of the ambient temperature at the thermostat, the improvement comprising:

means for storing the electrical signal representative of the ambient temperature existing at the time of termination of the control signal for the temperature modifying apparatus which is operative to control it into a state causing the ambient temperature to move toward the set-point;

means for measuring the overshoot or undershoot of the ambient temperature with respect to the set-point which results each time said control signal is generated; and means for terminating said control signal the next time it is generated, at the time of occurrence of an ambient temperature equal to the ambient temperature which existed the last time said control signal was terminated, plus an increment equal to the temperature undershoot which occurred the previous time or alternatively minus an increment equal to the temperature overshoot which occurred the previous time in order to adaptively minimize overshoot or undershoot.

7. In a thermostat operative to be connected to a temperature modifying apparatus to control the operative state of the apparatus and including means for generating an electrical signal representative of a desired temperature set-point and means for generating an electrical signal representative of the ambient temperature at the thermostat, the improvement comprising: means for generating control signals for the temperature modifying apparatus operative to control it into a state which causes the ambient temperature to move toward the set-point; means for terminating said control signals when the ambient temperature attains a particular temperature value; and means for adaptively modifying said particular temperature value as a function of the temperature difference between said set-point and the limit of the ambient temperature attained the the previous time the temperature modifying apparatus was controlled to said state.

* * * * *